(12) United States Patent
Patterson (10) Patent No.: US 6,467,710 B1
(45) Date of Patent: Oct. 22, 2002

(54) APPARATUS AND METHOD FOR PROCESSING, CREATING AND DISPENSING A ROUGHAGE RATION FOR LIVESTOCK

(76) Inventor: R C Patterson, Box 147, Kim, CO (US) 81049

( * ) Notice: Subject to any disclaimer, the term of this patent is extended or adjusted under 35 U.S.C. 154(b) by 0 days.

(21) Appl. No.: 09/444,620

(22) Filed: Nov. 22, 1999

Related U.S. Application Data (63) Continuation-in-part of application No. 09/245,546, filed on Feb. 5, 1999, now Pat. No. 6,086,001.

(51) Int. Cl.⁷ .............................................. B02C 25/00
(52) U.S. Cl. ............... 241/34; 241/101.76; 241/186.35; 241/605
(58) Field of Search .......................... 241/101.76, 605, 241/30, 34, 186.35

(56) References Cited

U.S. PATENT DOCUMENTS 5,626,298 A * 5/1997 Arnoldy .............. 241/101.761
6,199,781 B1 * 3/2001 Hruska ...................... 241/605

* cited by examiner

*Primary Examiner*—Mark Rosenbaum
(74) *Attorney, Agent, or Firm*—John E. Toupal; Harold G. Jarcho (57) ABSTRACT

A roughage processing and dispensing apparatus including a mobile frame defining a floor section for supporting a plurality of bales of roughage, a shredder section in which the bales are shredded, a discharge section for discharging roughage shredded in said shredder section and a bin for particulate feed material; a shredder disposed in the shredder section; a first conveyor for moving at least one of the bales into the shredder means at a given speed; and a conveyor system arranged to receive from the shredder the shredded content of the one bale, and to transport the content to the discharge section. Also included is an auxiliary conveyor for moving the feed material to the discharge section at a selected rate; a drive mechanism operable to provide simultaneous movement of the first conveyor, the auxiliary conveyor and the conveyor system; and a control system for varying the given speed relative to the selected rate.

25 Claims, 9 Drawing Sheets

APPARATUS AND METHOD FOR PROCESSING, CREATING AND DISPENSING A ROUGHAGE RATION FOR LIVESTOCK

This application is a Continuation-in-Part of U.S. Pat. application Ser. No. 09/245,546 filed Feb. 5, 1999 now U.S. Pat. No. 6,086,001.

BACKGROUND OF THE INVENTION

The present invention relates to processing roughage, creating a ration, and delivering it to livestock.

In modern agriculture practice, it is considered advantageous to process roughage to be fed to livestock. It is also considered advantageous to use more than one feed course to create a ration to provide the animals' proper nutritional requirements. It is further necessary to deliver the ration to the animals.

U.S. Pat. No. 2,221,266 to Roach (1939); U.S. Pat. No. 2,685,900 to Cross (1954); 2,941,505 to Middlen (1960); U.S. Pat. No. 3,035,729 to Soares et al (1962); U.S. Pat. No. 3,379,417 to Luscombe (1968); and U.S. Pat. No. 3,999,674 to Meitl (1976) all provide various means of processing only one type of roughage and delivering it to livestock, but they do not create a ration.

U.S. Pat. No. 3,168,291 to Knoedler et al (1965); U.S. Pat. No. 3,184,108 to Grau (1965); U.S. Pat. No. 3,265,227 to Vratil et al (1966); U.S. Pat. No. 4,561,781 to Seymour (1985); U.S. Pat. No. 4,907,538 to Helmle et al (1990); and U.S. Pat. No. 5,718,188 to Erickson (1998) all employ various methods of blending a grain ration and delivering it to livestock. They, however, do not process it, and they will not work on large bales of roughage.

U.S. Pat. No. 3,254,878 to Lorenzen (1966) employs a method to process and deliver a grain ration to livestock. However, it will not work on large bales of roughage.

U.S. Pat. No. 4,428,537 to Heide (1984) employs a method of processing, blending, and delivering a silage and grain ration, but it will not work on large bales of roughage.

U.S. Pat. No. 5,626,298 to Arnoldy (1997) does process large bales of roughage, but does not create a ration or delivering it to livestock.

SUMMARY OF THE INVENTION

The present invention provides a machine and method of processing large bales of roughage while simultaneously creating a ration and immediately delivering the ration to livestock ready for consumption.

Accordingly, several objects and advantages of the invention are:

(a) to provide a machine to process large bales of hay or roughage;

(b) to provide a machine that creates a ration of varying ratios from two different types of roughage;

(c) to provide a machine that immediately delivers a roughage ration to livestock ready for consumption;

(d) to provide a machine which blends cheaper, lower quality feed material with higher quality feed material to create a more effective and economical ration;

(e) to provide one machine which performs the functions that previously required two or more machines;

(f) to provide a machine to reduce the amount of time and labor required to process large bales of roughage, create a ration, and deliver the ration to livestock.

Still further objects and advantages will become apparent from a consideration of the ensuing description and drawings.

DESCRIPTION OF THE DRAWINGS

These and other objects and features of the invention will become more apparent upon a perusal of the following description taken in conjunction with the accompanying drawings. In the drawings, closely related figures have the same number but different alphabetic suffixes.

DESCRIPTION OF THE PREFERRED EMBODIMENTS

Figure 1:
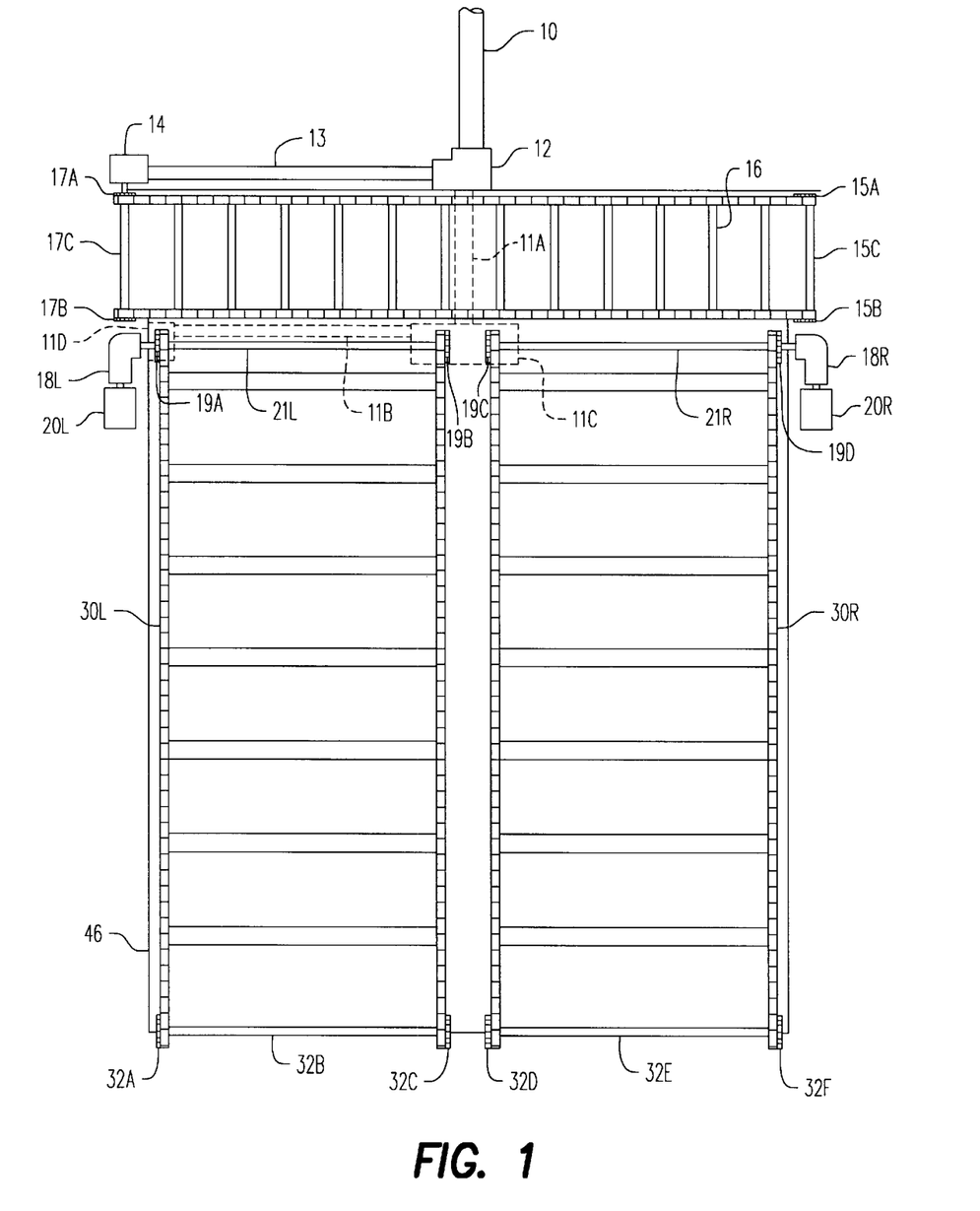
FIG. 1 is a plan view of a preferred embodiment of the invention.
Figure 2:
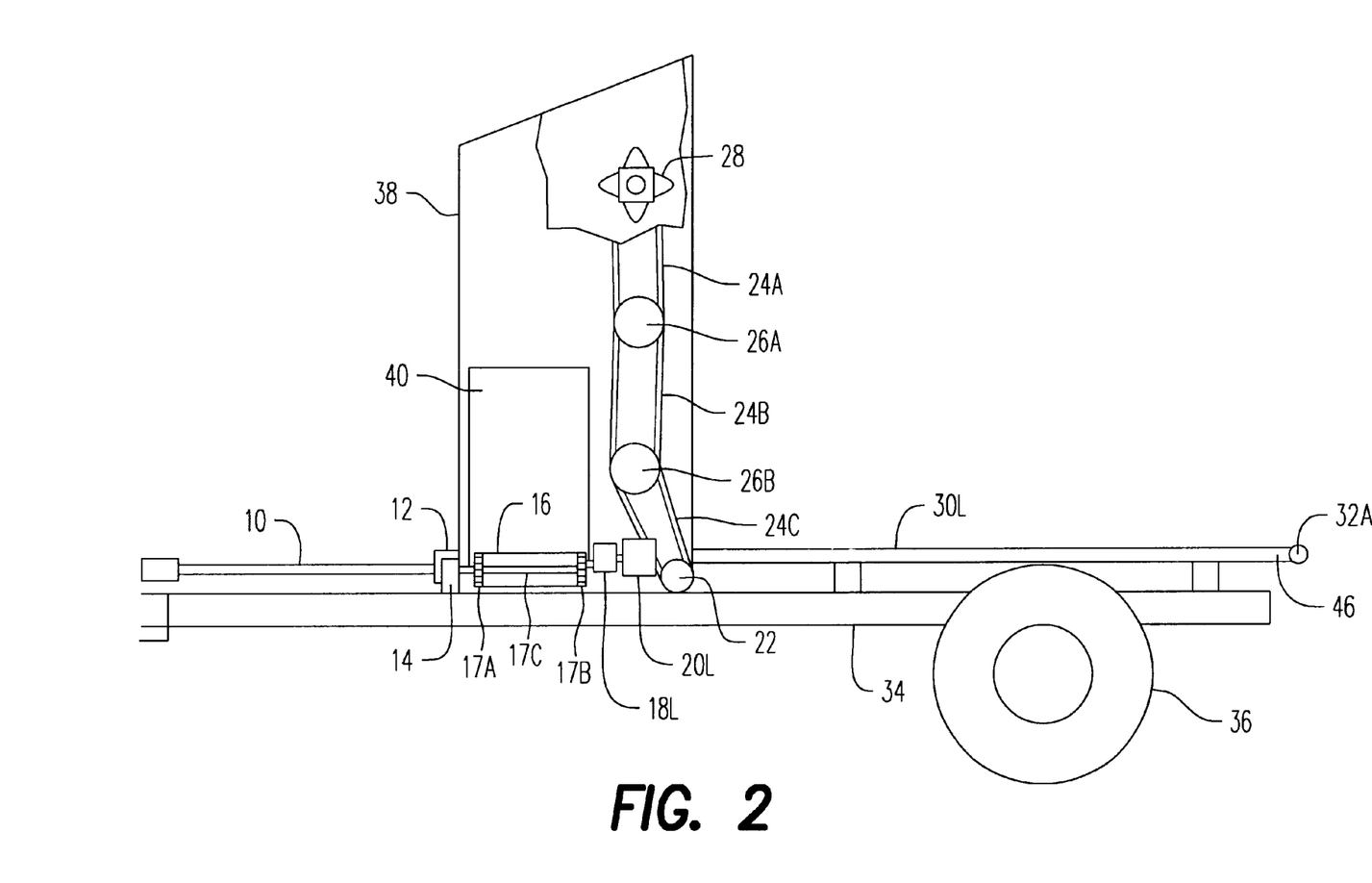
FIG. 2 is a side elevational view of the embodiment shown in FIG. 1.

A preferred embodiment of the present invention is illustrated in FIG. 1 (plan view) and FIG. 2 (side elevational view). In FIG. 1, a mobile frame 34 with wheels 36 (FIG. 2) includes first and second parallel translational conveyor chains 30L and 30R, turning on idler gears 32A, 32C, 32D, 32F, and idler shafts 32B and 32E and driven by drive gears 19A, 19B, 19C, 19D and drive shafts 21L and 21R which are connected to right-angle gear boxes 18L and 18R which are connected to hydraulic motor 20L and hydraulic motor 20R. Another translational conveyor system chain 16 is directed transversely to the first and second chains 30L, 30R and turns on idler gears 15A, 15B, and idler shaft 15C and is driven by drive gears 17A, 17B, attached to drive shaft 17C which is connected to right-angle gear box 14 which is connected to shaft 13 which is connected to double-out gear box 12 which is connected to PTO shaft 10 which is connected to tractor PTO power output shaft (not shown).

In FIG. 2, the mobile frame 34 includes a transport hood 38 which covers three vertically spaced apart shredders 28, driven by,respectively, chains 24A, 24B, and 24C and gears 26A and 26B which are driven by gear 22 which is connected to gear box 11D which is connected to shaft 11B which is connected to right-angle gear box 11C which is connected to shaft 11A which is connected to double-out gear box 12 which is driven by PTO shaft 10 which connects to PTO output shaft on the tractor (not shown). Conveyor chain 16 discharges processed ration through discharge opening 40.

Figure 3:
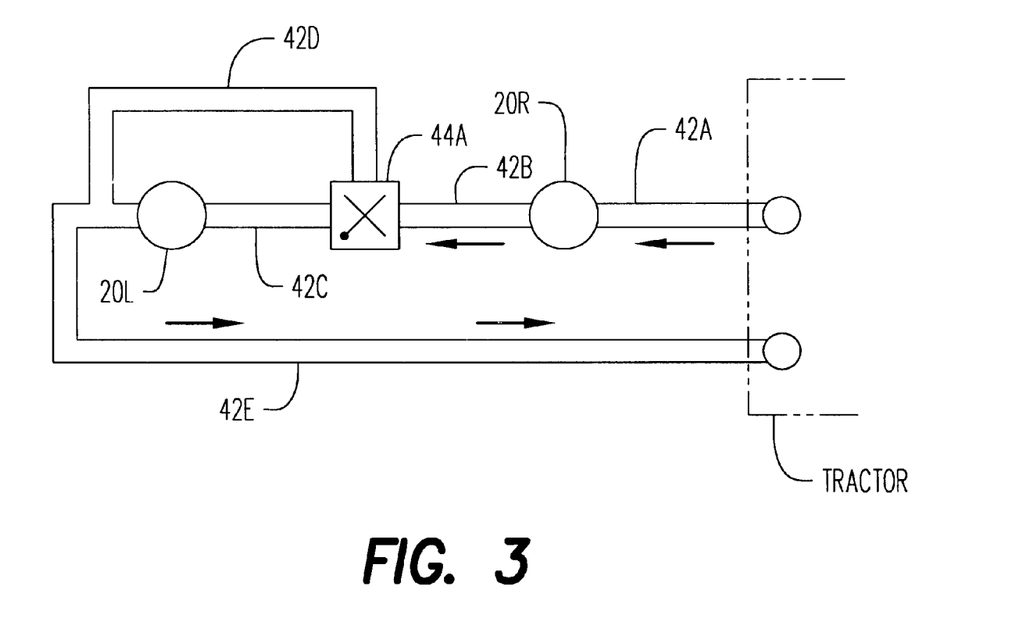
FIG. 3 is a schematic view of a hydraulic system of the embodiment shown in FIGS. 1 and 2.

In FIG. 3, hydraulic hose 42A connects tractor hydraulic system (not shown) to hydraulic motor 20R which is connected to hydraulic hose 42B connected to flow control divertor 44A which is connected to hydraulic hose 42C connected to hydraulic motor 42L connected to hydraulic hose 42E which is connected to return side of hydraulic system on tractor (not shown). Hydraulic hose 42D connects flow control divertor to hydraulic hose 42E.

OPERATION

FIG. 1 shows two continuous floor chains 30R and 30L. Each one is wide enough to carry a large bale of roughage. The length of floor chains 30R and 30L can vary to hold any number of bales from one to four in succession. Floor chain 30R is deposed between idler gear 32F and 32D and idler shaft 32E and drive gears 19C and 19D which are secured to drive shaft 21R which is driven through right-angle gear box 18R by hydraulic motor 20R.

Activation of hydraulic motor 2OR is shown in FIG. 3. Hydraulic hose 42A carries pressurized hydraulic fluid from tractor hydraulic system (not shown) to hydraulic motor 20R. When the tractor hydraulics are activated the bale, or bales, on floor chain 30R will move forward at a given speed to be processed by shredders 28 shown best in FIG. 2.

Shredders 28 are turned by chains 24C. 24B, and 24A and gears 26A and 26B. Gear 22 is powered by tractor PTO through PTO shaft 10, double-out gear box 12, shaft 11B, right-angle gear box 11C, shaft 11A, and gear box 11D. Hood 38 contains the processed roughage and allows it to fall on conveyor chain 16 which is deposed between idler gears 15A, 15B and idler shaft 15C and drive gears 17A and 17B which are turned by drive shaft 17C, turned by right-angle gear box 14, turned by shaft 13, turned by double-out gear box 12, turned by PTO shaft 10, which is turned by tractor PTO output shaft (not shown). Thus, a primary conveyor system including the conveyor chain 30R, the shredder 28 and the conveyor chain 16 delivers the processed roughage through opening 40.

Pressurized hydraulic fluid passes through hydraulic motor 20R, causing it to be activated. It is then routed through hydraulic hose 42B (best shown in FIG. 3) to flow control divertor 44A. The pressurized hydraulic fluid is then channeled through hydraulic hose 42C to hydraulic motor 20L which turns right-angle gear box 18L (best illustrated in FIG. 1) which turns drive shaft 21L which turns drive gears 19A and 19B which move floor chain 30L forward. Floor chain 30L is a continuous floor chain and deposed between drive gears 19A and 19B and idler gears 32A and 32C and idler shaft 32B. The bale, or bales, on auxiliary floor conveyor chain 30L would preferably consist of a bale of roughage differing in nutritional value than the bale, or bales, on floor chain 30R. Varying amounts of pressurized hydraulic fluid are diverted around hydraulic motor 20L (best illustrated in FIG. 3) by flow control divertor 44A through hydraulic hose 42D and returned through hydraulic hose 42E to return side of tractor hydraulic system (not shown). The speed that hydraulic motor 20L turns will vary according to the amount of pressurized hydraulic fluid diverted around, rather than through, hydraulic motor 20L. By this process, the predetermined speed at which the bales are carried to shredder 28 (FIG. 2) on floor chain 30L will vary from the given speed at which the bales on floor chain 30R are carried to shredders 28. Thus, the proportions of roughage on floor chain 30L that has been processed by shredders 28 can be varied from the proportions of roughage on floor chain 30R that has been processed by shredders 28. Conveyor chain 16 discharges selected relative proportions of the processed ration through opening 40 and deposits it into a feed bunk ready for livestock consumption.

Floor 46 (FIG. 2) is connected to mobile frame 34 which rides on wheels 36. The frame 34 can be pulled by a tractor (not shown) and deliver the selected feed ration to livestock for consumption immediately after being processed. Use of the preferred embodiment will reduce the number of machines and the man hours required to meet the nutritional needs of livestock being fed solely, or mostly, roughage. In addition, the embodiment can more efficiently and economically combine large bales of roughage of differing nutritional values in varied ratios while increasing the palatability of the feed by processing it and providing immediate delivery of the ration to the livestock.

While the above description contains many specificities, they should not be construed to as limitations on the scope of the invention, but rather as en exemplification of one preferred embodiment thereof. Many other variations are possible. For example, the whole invention can be mounted on a tractor for additional mobility. An additional flow control divertor can be added to make the speed of both floor chains adjustable. An additional flow control divertor and hydraulic motor can be added to run the dispensing conveyor chain instead of the PTO drive. The hydraulic schematics can be run individually and through flow divertors rather than through a series. Pulleys and belts can be used in place of gears and chains.

Figure 4:
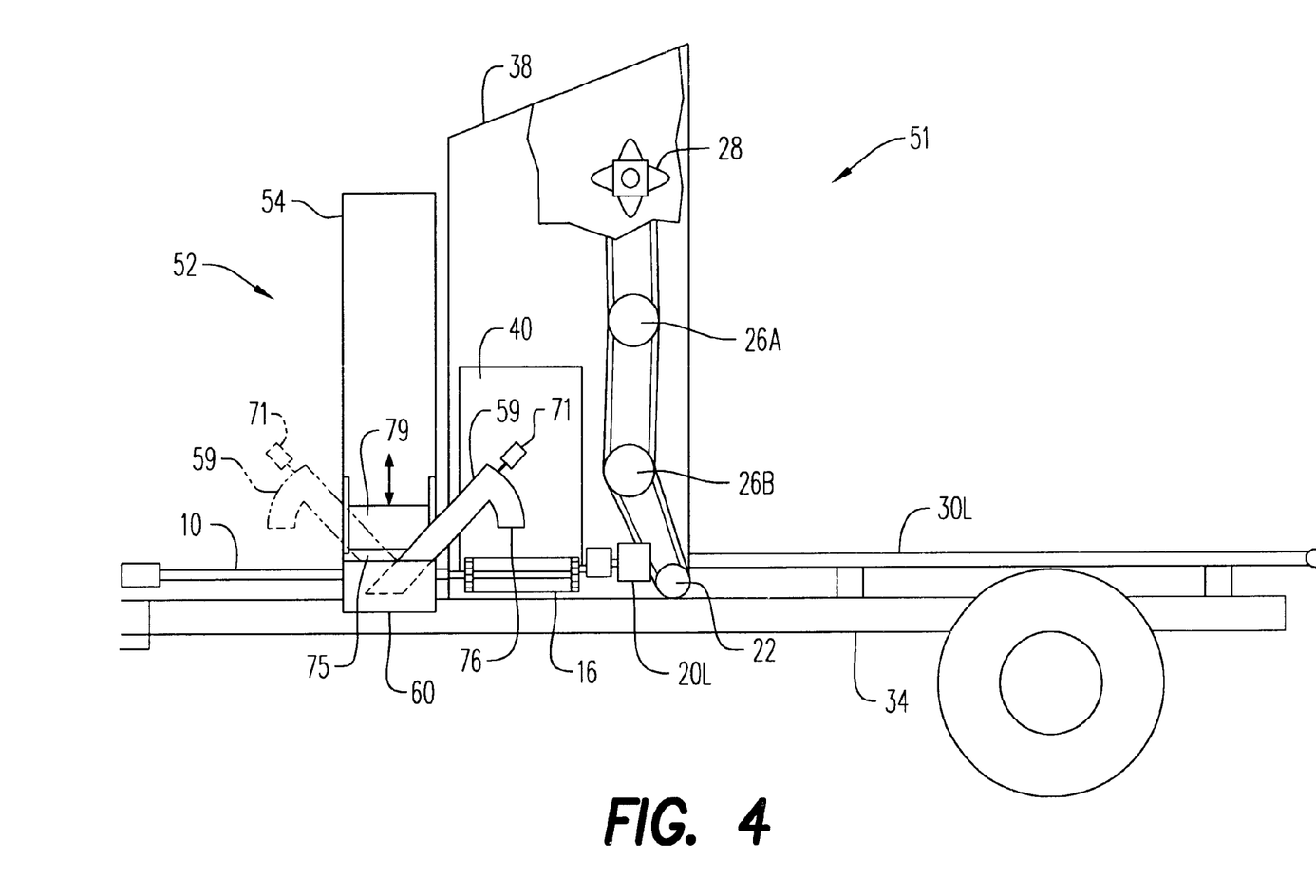
FIG. 4 is a side elevational view of another embodiment of the invention.
Figure 5:
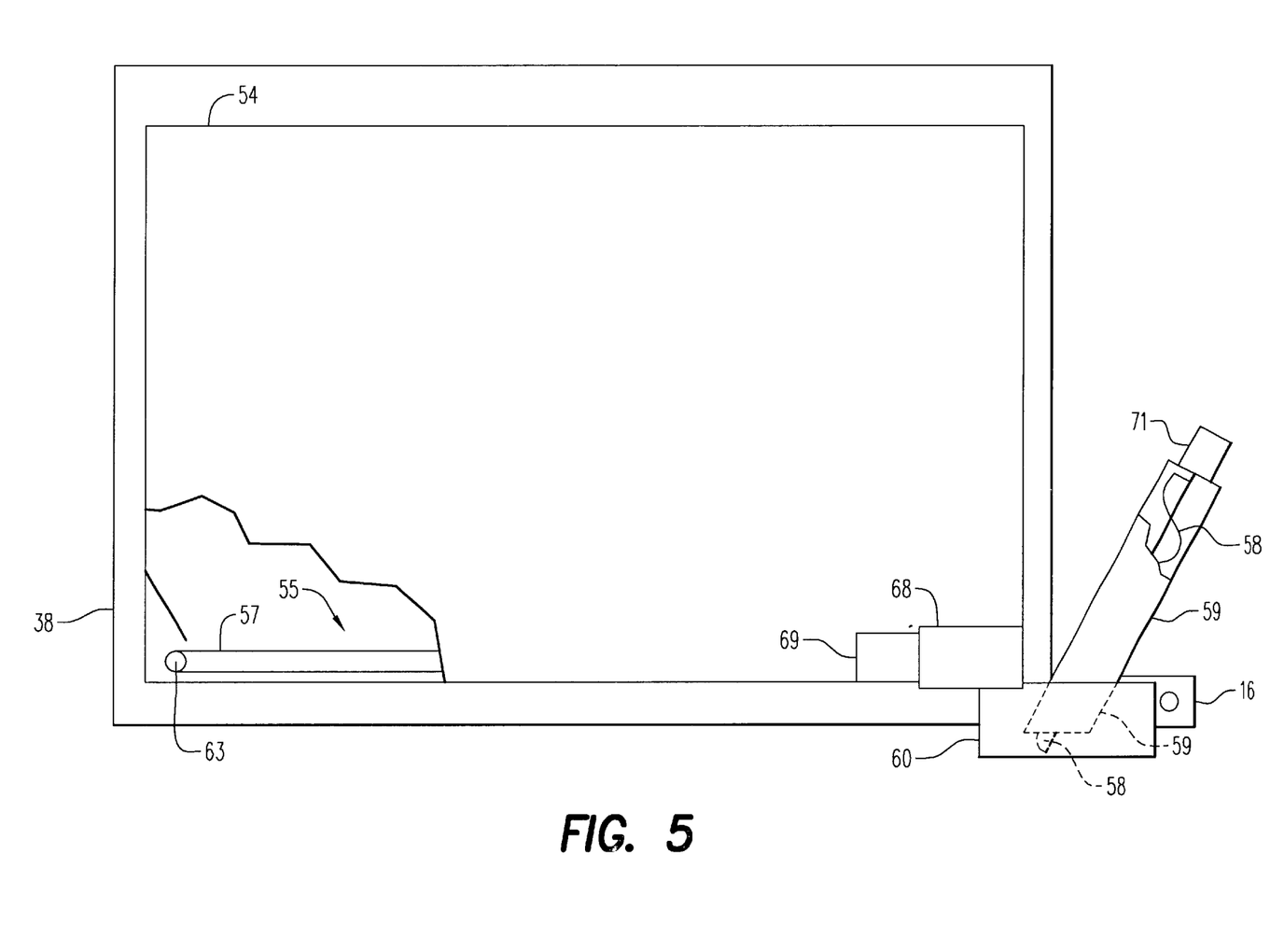
FIG. 5 is a front elevational view of the embodiment shown in FIG. 4.
Figure 6:
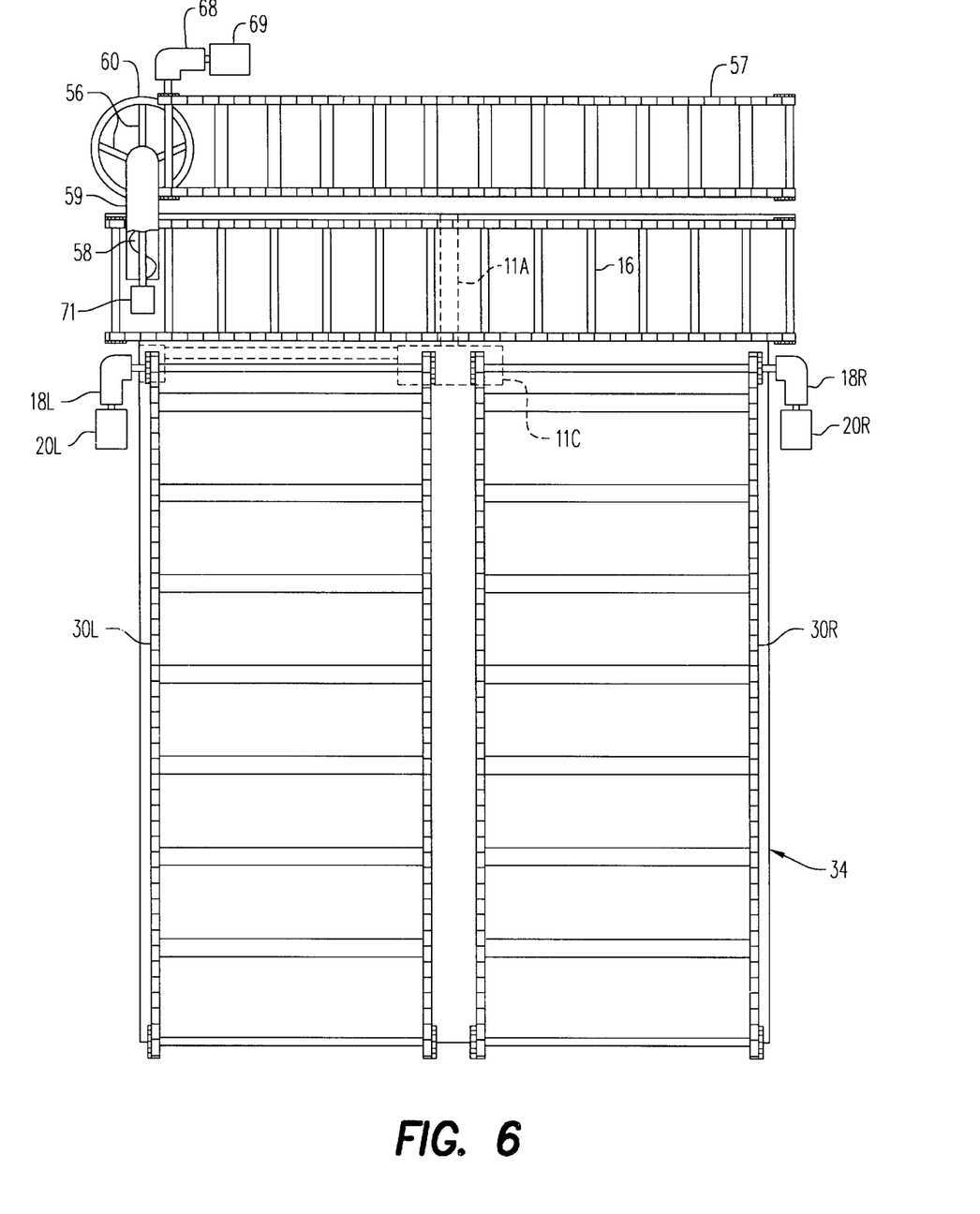
FIG. 6 is a cutaway top view of the embodiment shown in FIGS. 4 and 5.

Illustrated in FIGS. 4–6 is another embodiment 51 of the invention in which components corresponding to those in the embodiment of FIGS. 1 and 2 bear the same reference numerals. Added to the embodiment 51 is a particulate feed material dispenser section 52 mounted on the mobile frame 34 forwardly adjacent to the shredder section 38. Included in the dispenser section 52 are a bin 54 for feed material such as grain and an auxiliary conveyor system 55 for transporting feed material from the bin 54 to a region adjacent to the discharge section 40. The conveyor system 55 includes a chain conveyor 57 mounted at the bottom of the bin 54 and an auger 58 (FIGS. 5 and 6) mounted in a discharge chute 59 projecting out of an open upper end of a cylindrical grain slump 60. Supporting the chute 59 in the slump 60 are a plurality of struts 56. Preferably, the slump 60 is pivotally mounted on the frame 34 so as to allow movement of the discharge chute 59 relative to the discharge section 40 as shown in FIG. 4. Supporting the chain conveyor 57 are idler gears 61, 62 mounted on an idler shaft 63 and drive. gears 65, 66 fixed to a drive shaft 67. A gear box 68 is operatively coupled to the shaft 67 and driven by a hydraulic drive motor 69. Mounted on an upper surface of the chute 59 is a hydraulic drive motor 71 operatively coupled to the auger 58.

During use of the dispenser section 52, grain retained in the bin 54 is conveyed by the chain conveyor 57 through an opening 75 (FIG. 4) and deposited in the slump 60. That grain then is conveyed upwardly by the auger 58 and discharged through an outlet opening 76 in the chute 59. The discharged grain is deposited on the conveyor 16 and thereby combined with the shredded roughage received from the shredders 28. However, the slump 60 and chute 59 can be rotated into other positions to provide grain discharge into other adjacent areas as, for example, directly into a feed bunker (not shown). By controlling the relative speeds of the bale conveyors 30L and 30R and the rate at which grain is discharged from the chute 59, the relative proportions of combined particulate feed and roughage feed can be selectively varied to provide a desired and economical feed ration. The grain discharge rate can be selectively and independently varied by vertical adjustment of a door 79 covering the opening 75 or by controlling the speeds of the chain conveyor 57 or auger 58 as described hereinafter or by any combination thereof.

Figure 7:
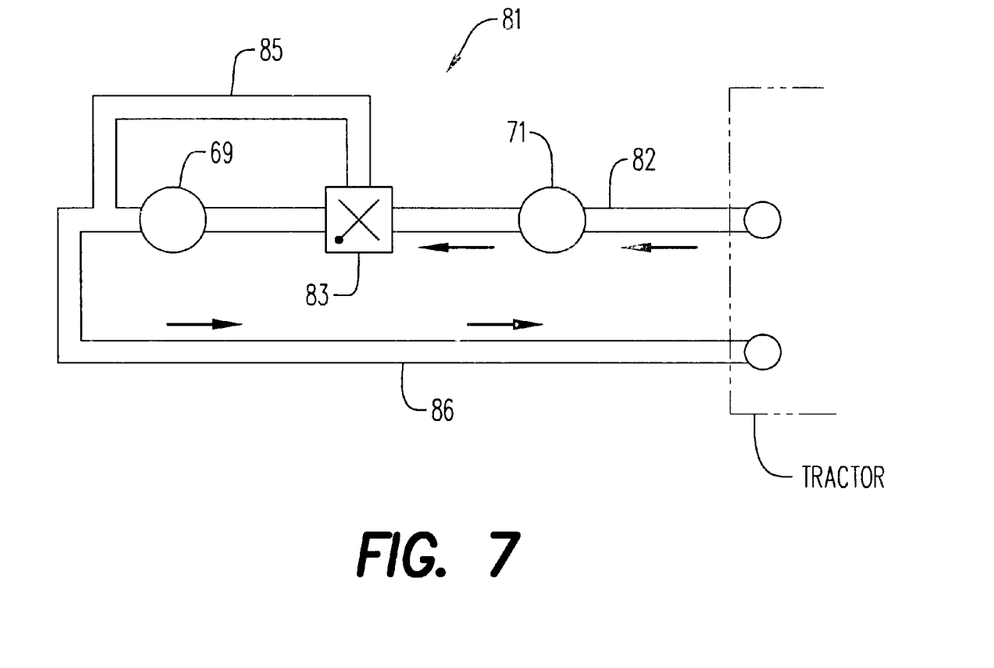
FIGS. 7–9 are hydraulic control systems for the embodiment shown in FIGS. 4–6.

FIG. 7 illustrates one hydraulic system embodiment 81 for independently controlling the speed of the conveyor 57. A hydraulic input line 82 is connected between a pump (not shown) on the tractor to a divertor valve 83 via the motor 71. The divertor valve 83 can be adjusted to selectively divide fluid flow between the motor 69 and a bypass line 85 for return in a return line 86. Thus, speed of the conveyor 57 coupled to the motor 69 is selectively varied by adjustment of the diversion valve 83.

Figure 8:
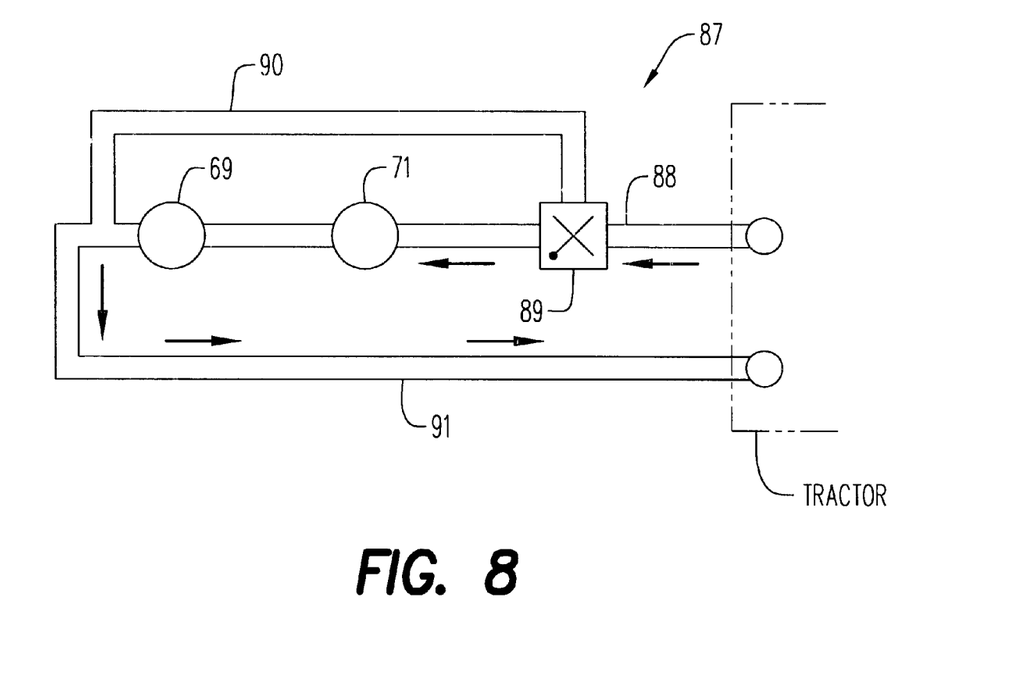

Another hydraulic system embodiment 87 is depicted in FIG. 8. Connected to a pump (not shown) by an input line 88 is a series combination of a divertor valve 89, the motor 69 and the motor 71. A bypass line 90 is connected between the divertor valve 89 and a return line 91. By selective adjustment of the divertor valve 89, the speeds of the chain conveyor 57 and the auger 58 can be varied to provide a desired rate of grain discharge from the chute 59.

Figure 9:
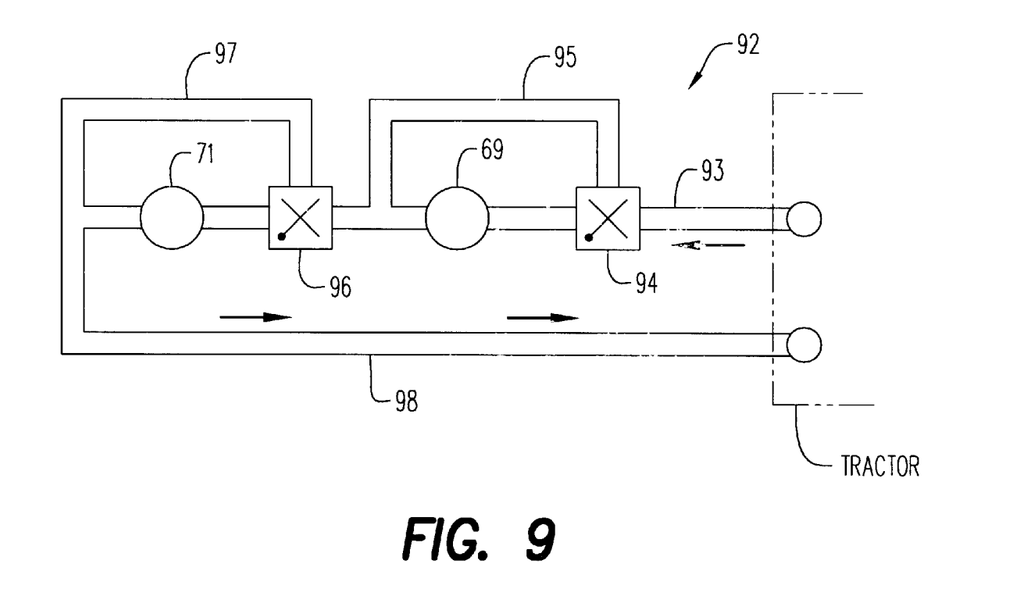

FIG. 9 illustrates another hydraulic system embodiment 92 which provides independent speed adjustments of the chain conveyor 57 and auger 58. An input line 93 is connected between a pump (not shown) and a divertor valve 94 which feeds the motor 69 and a bypass line 95. Connected between the motor 69 and bypass line 95 is a second divertor valve 96 which feeds a bypass line 97 and the motor 71 both of which are connected to a return line 98. By selectively and independently adjusting the divertor valves 94 and 96, independent speed control of the chain conveyor 57 and auger 58 can be obtained to selectively vary the rate of grain discharge from the discharge chute 59.

Obviously, many modifications and variations of the present invention are possible in light of the above teachings. It is to be understood, therefore, that the invention can be practiced otherwise than as specifically described.

What is claimed is:

1. Roughage processing and dispensing apparatus for feeding livestock and comprising:
    a mobile frame defining a floor section for supporting one or more bales of roughage, a shredder section in which the bales are shredded, a discharge section for discharging roughage shredded in said shredder section and a bin for particulate feed material;
    shredder means disposed in said shredder section;
    a first conveyor for moving at least one of the bales into said shredder means at a given speed;
    a conveyor system arranged to receive from said shredder means the shredded content of the one bale, and to transport the content to said discharge section;
    an auxiliary conveyor means for combining the feed material with the shredded content at a selected rate; and
    a control system operable to provide simultaneous operation of said first conveyor, said auxiliary conveyor means and said conveyor system.

2. An apparatus according to claim 1 wherein said auxiliary conveyor means comprises a discharge chute, and an auger for moving the feed material out of said discharge chute.

3. An apparatus according to claim 2 wherein said discharge chute is movable relative to said discharge section.

4. An apparatus according to claim 3 wherein said auxiliary conveyor means further comprises an intermediate conveyor for conveying the feed material from said bin to said auger.

5. An apparatus according to claim 4 wherein said control system comprises means for independently varying the speed of said intermediate conveyor.

6. An apparatus according to claim 5 wherein said control means further comprises means for independently varying the speed of said auger.

7. Roughage processing and dispensing apparatus for feeding livestock and comprising:
    a mobile frame defining a floor section for supporting a plurality of bales of roughage, a shredder section in which the bales are shredded, a discharge section for discharging roughage shredded in said shredder section and a bin for particulate feed material;
    shredder means disposed in said shredder section;
    first conveyor for moving at least one of the bales into said shredder means at a given speed;
    a second conveyor for moving at least another of the bales into said shredder means at a predetermined speed;
    conveyor system arranged to receive from said shredder means the shredded content of the one and another bales, and to transport the content to said discharge section;
    an auxiliary conveyor means for combining the feed material with the shredded content at a selected rate; and
    a control system operable to provide simultaneous operation of said first conveyor, said second conveyor, said auxiliary conveyor means and said conveyor system, and said control system comprises means for selectively varying the ratios of said given speed, said predetermined speed, and said selected rate.

8. Apparatus according to claim 7 wherein said first conveyor and said second conveyor are arranged to move the one and another bales in substantially parallel directions.

9. Apparatus according to claim 8 wherein said conveyor system is arranged to transport the shredded contents in a direction transverse to said parallel directions.

10. Apparatus according to claim 9 wherein said drive means comprises a first hydraulic motor mechanically coupled to said first conveyor, and a second hydraulic motor mechanically coupled to said second conveyor, a third hydraulic motor coupled to said auxiliary conveyor means; and said control system comprises a hydraulic system fluid coupled to said first, second and third hydraulic motors and adapted to provide independent speed control thereof.

11. Apparatus according to claim 10 wherein said first conveyor and said second conveyor are horizontally spaced apart.

12. Apparatus according to claim 7 wherein said mobile frame is adapted for towing by a tractor and comprises a PTO shaft for coupling with the tractor, and said drive means comprises hydraulic hoses for connection to the tractor.

13. An apparatus according to claim 7 wherein said auxiliary conveyor means comprises a discharge chute, and an auger for moving the feed material out of said discharge chute.

14. An apparatus according to claim 13 wherein said discharge chute is movable relative to said discharge section.

15. An apparatus according to claim 14 wherein said auxiliary conveyor means further comprises an intermediate conveyor for conveying the feed material from said bin to said auger.

16. An apparatus according to claim 15 wherein said control means comprises means for independently varying the speed of said intermediate conveyor.

17. An apparatus according to claim 16 wherein said control means further comprises means for independently varying the speed of said auger.

18. An apparatus according to claim 7 wherein said auxiliary conveyor means moves the feed material to said discharge section for combination with the shredded content.

19. An apparatus according to claim 18 wherein said auxiliary conveyor means comprises a discharge chute, and an auger for moving the feed material out of said discharge chute.

20. An apparatus according to claim 19 wherein said discharge chute is movable relative to said discharge section.

21. An apparatus according to claim 1 wherein said control system is adapted to selectively vary said given speed.

22. Livestock feeding apparatus comprising:

a mobile frame defining a section for supporting a bale of roughage, a shredder section in which the bale is shredded, a discharge section for discharging roughage shredded in said shredder section and a bin for particulate feed material;

shredder means disposed in said shredder section;

a first conveyor for moving the bale into said shredder means at a given speed;

a translational conveyor system arranged to receive from said shredder means the shredded content of the one bale, and to transport the content to said discharge section;

an auxiliary conveyor movable at a predetermined speed to combine the feed material with the shredded content; and a control system operable to provide simultaneous operation of said first conveyor, said auxiliary conveyor means and said conveyor system, and adapted to provide selective variation in relative proportions of the combined feed material and shredded content.

23. An apparatus according to claim 22 wherein said control system provides said selective variation in said proportions by allowing selective variation in said given speed.

24. An apparatus according to claim 23 wherein said control system provides said selective variation in said proportions by allowing selective variation in said predetermined speed.

25. An apparatus according to claim 22 wherein said first conveyor is a translational conveyor.

* * * * *